United States Patent [19]

Saitou et al.

[11] 4,355,750
[45] Oct. 26, 1982

[54] DOUBLE-CAPSTAN TAPE DRIVING DEVICE

[75] Inventors: Sinichi Saitou, Hachioji; Toshikazu Kato, Hino; Kenji Kimura, Tachikawa; Ken Satoh, Akigawa; Tsutomu Shibata, Hachioji; Seizo Watanabe, Hachioji; Ken Ohshima, Hachioji, all of Japan

[73] Assignee: Olympus Optical Co., Ltd., Tokyo, Japan

[21] Appl. No.: 199,325

[22] Filed: Oct. 21, 1980

[30] Foreign Application Priority Data

Oct. 26, 1979 [JP] Japan .................... 54-148560[U]

[51] Int. Cl.³ .......................................... B65H 17/22
[52] U.S. Cl. .................................................. 226/188
[58] Field of Search ................ 226/25, 188, 181, 182; 242/189–191, 203, 206–210; 360/74, 96; 318/6, 7

[56] References Cited

U.S. PATENT DOCUMENTS 3,419,202 12/1968 Maxey ........................... 226/25
4,001,552 1/1977 Muller ......................... 242/191 X Primary Examiner—Leonard D. Christian
Attorney, Agent, or Firm—Frishauf, Holtz, Goodman and Woodward

[57] ABSTRACT

First and second capstans are rotated at respective speeds by first and second motors. The speeds of revolution of the first and second motors are detected as detection signals, and the revolution speed of at least one of the first and second motors is controlled in accordance with a difference between the detection signals. An offset voltage is added to one of the detection signals corresponding to the revolution speeds of the first and second motors for the control of tape tension.

8 Claims, 1 Drawing Figure

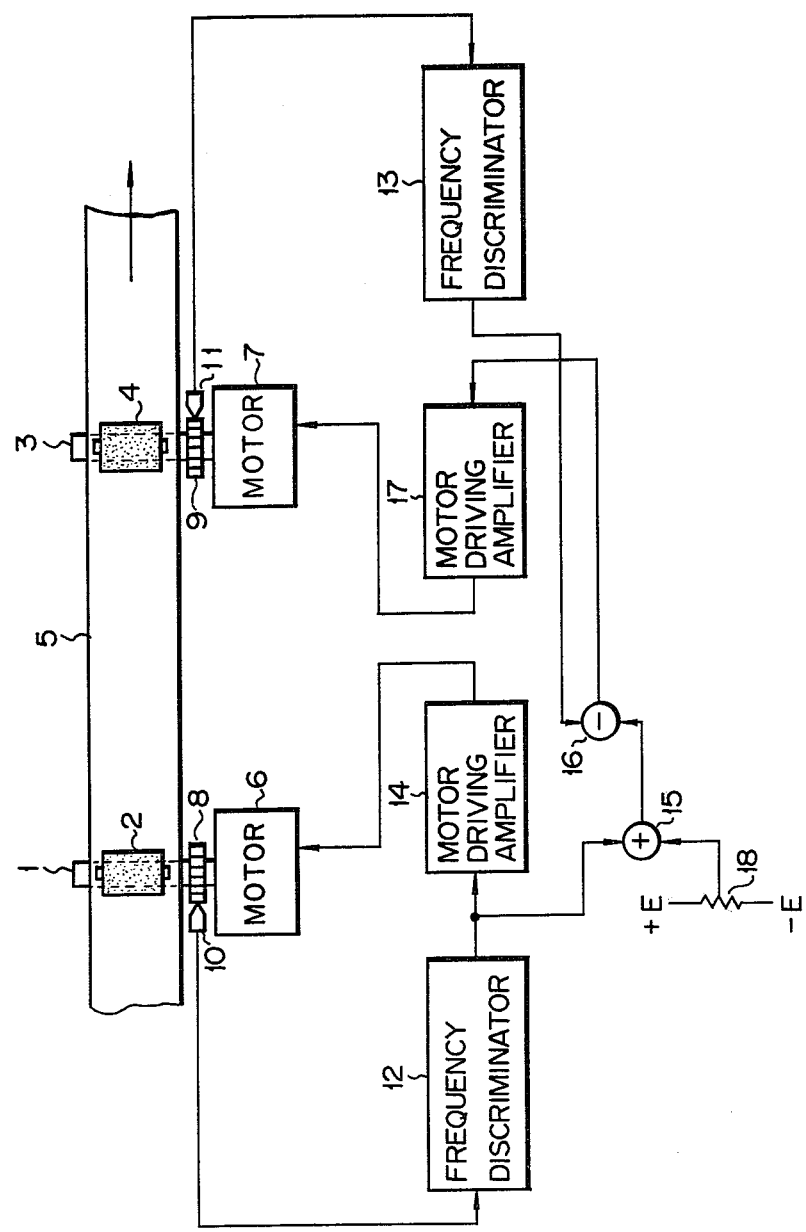

DOUBLE-CAPSTAN TAPE DRIVING DEVICE

BACKGROUND OF THE INVENTION

This invention relates to a tape driving device, and more specifically to a double-capstan tape driving device having two capstans.

In double-capstan tape driving devices, the speed of revolution of a tape supply capstan is set lower than that of a tape take-up capstan in order to obtain a suitable tape tension. In a prior art double-capstan tape driving device, however, the revolution ratio between the two capstans is fixed, so that the tape tension cannot be adjusted according to the type or secular changes of tape. In other words, it is impossible to drive a tape always at a proper tension.

SUMMARY OF THE INVENTION

Accordingly, the object of this invention is to provide a double-capstan tape driving device capable of tape tension adjustment.

According to this invention, there is provided a double-capstan tape driving device which comprises first and second servo loops for rotating first and second capstans at respective speeds, and means for supplying an offset voltage to at least one of the servo loops to change the revolution speed of one of the first and second capstans.

BRIEF DESCRIPTION OF THE DRAWING

The accompanying drawing is a circuit diagram of a double-capstan tape driving device according to an embodiment of this invention.

DETAILED DESCRIPTION OF THE PREFERRED EMBODIMENT

Referring to the accompanying drawing, a magnetic tape 5 is held between a first capstan 1 and a first pinch roller 2 and between a second capstan 3 and a second pinch roller 4 so as to be able to run. The first capstan 1 is connected directly with the shaft of a first motor 6, and the second capstan 3 is connected directly with the shaft of a second motor 7. Encoding members 8 and 9 are mounted on the shafts of the first and second motors 6 and 7, respectively. These encoding members 8 and 9 are each provided with e.g. slits at regular intervals. Sensors 10 and 11 are disposed in close vicinity to the encoding members 8 and 9, respectively. The output terminals of the sensors 10 and 11 are connected respectively to frequency discriminators 12 and 13. The output terminal of the frequency discriminator 12 is connected to a motor driving amplifier 14 and one input terminal of a mixer 15, while the output terminal of the frequency discriminator 13 is connected to one input terminal of a difference detector 16. The other input terminal of the difference detector 16 is connected with the output terminal of the mixer 15, and the output terminal of the detector difference 16 is connected to a motor driving amplifier 17. The other input terminal of the mixer 15 is connected with a potentiometer 18 for tape tension adjustment. The motor driving amplifiers 14 and 17 are connected respectively to the motors 6 and 7.

In the above-mentioned construction, the motor 6, encoding member 8, sensor 10, frequency discriminator 12, and moving driving amplifier 14 constitute a first servo loop which causes the first capstan 1 to rotate at a fixed speed. The motor 7, encoding member 9, sensor 11, frequency discriminator 13, difference detector 16, and motor driving amplifier 17 constitute a second servo loop which causes the second capstan 3 to rotate at a fixed speed. The revolution speeds of the first and second capstans 1 and 3, i.e. the speeds of the motors 6 and 7, may be made equal by equalizing the output voltages of the frequency discriminators 12 and 13. The difference detector 16 is intended to detect the difference between the output voltages of these two frequency discriminators 12 and 13. When the motors 6 and 7 are rotating at equal speeds, signals corresponding to the speeds are produced from the encoding members 8 and 9 and the sensors 10 and 11, and are applied to the inputs of their corresponding frequency discriminators 12 and 13, respectively. If the tension adjustment potentiometer 18 is set at zero at this time, the output voltage of the frequency discriminator 12 is supplied through the mixer 15 to the difference detector 16, where the difference between the respective output voltages of the frequency discriminators 12 and 13 is calculated. In this case, the difference is zero because these two output voltages are equal, and the motor driving amplifier 17 drives the motor 7 without changing the motor speed. Namely, the motors 6 and 7 rotate at the same speed. Accordingly, the tape supply capstan or the first capstan 1 and the tape take-up capstan or the second capstan 3 rotate at the same speed with zero tape tension. When the tension adjustment potentiometer 18 is adjusted to supply an offset voltage to the mixer 15, the offset voltage is added to the output voltage of the frequency discriminator 12. When the summation voltage at the output of mixer 15 is supplied to the difference detector 16, the difference between the summation voltage and the output voltage of the frequency discriminator 13 is detected and supplied to the motor driving amplifier 17. Thus, the speed or number of revolutions of the motor 7 is increased by such difference. As a result, the second capstan 3 rotates faster than the first capstan 1, and a tension corresponding to the speed difference is created in the tape. Namely, the tape tension can be adjusted at will by suitably setting the tension adjustment potentiometer 18. Thus, after the tape tension is set at the desired level, the tape is driven stably with the set tape tension maintained by the first and second servo loops.

According to this invention, as described above, the tape driving operation can be performed with a proper tape tension according to the type or secular changes of tape or head since the tape tension can be adjusted optionally.

Although in the above-mentioned embodiment the tape tension is to be adjusted by increasing the speed of the tape take-up capstan with the speed of the tape supply capstan kept constant, such adjustment may alternatively be achieved by reducing the speed of the tape supply capstan while keeping the tape take-up capstan at a fixed speed.

What we claim is:

1. A double-capstan tape driving device having first and second capstans adapted to be in driving contact with the tape, comprising:

first and second servo loops coupled to the first and second capstans, respectively, for rotating said first and second capstans at respective speeds independently of each other; and revolution speed control means coupled to at least one of said first and second servo loops for selectively supplying an offset voltage, which is generated externally of said first and second servo loops, to at least one of said first and second servo loops to selectively change a revolution speed of one of said first and second capstans independently of the revolution speed of the other of said first and second capstans to thereby selectively change the tension applied to the tape between the first and second capstans when said first and second capstans are in driving contact with the tape.

2. A double-capstan tape driving device according to claim 1, wherein:

said first servo loop includes a first motor connected directly with said first capstan, first signal output means for producing an output signal having a frequency corresponding to the revolution speed of said first motor, and a first frequency discriminator for frequency-discriminating the output signal of said first signal output means and for producing an output signal which is a function of the revolution speed of said first motor; and said second servo loop includes a second motor connected directly with said second capstan, second signal output means for producing an output signal having a frequency corresponding to the revolution speed of said second motor, and a second frequency discriminator for frequency-discriminating the output signal of said second signal output means and for producing an output signal which is a function of the revolution speed of said second motor.

3. A double-capstan tape driving device according to claim 2, wherein said revolution speed control means includes difference detecting means for generating a difference signal corresponding to the difference between the output signals of said first and second frequency discriminators, and means coupled to said difference detecting means for changing the revolution speed of at least one of said first and second motors as a function of said difference signal from said difference detecting means.

4. A double-capstan tape driving device according to claim 3, wherein said revolution speed control means includes adding means for adding said supplied offset voltage to the output of at least one of said first and second frequency discriminators.

5. A double-capstan tape driving device according to claim 2, wherein:

said first signal output means includes a first encoding member connected to the shaft of said first motor so as to be rotatably by said shaft of said first motor and having a plurality of first slits formed at regular intervals; and a first sensor disposed in close vicinity to said first encoding member for producing an output signal corresponding to the revolution speed of said first motor in response to said first slits passing thereby due to rotation of said first encoding member; and said second signal output means includes a second encoding member connected to the shaft of said second motor so as to be rotatable by said shaft of each second motor and having a plurality of second slits formed at regular intervals; and a second sensor disposed in close vicinity to said second encoding member for producing an output signal corresponding to the revolution speed of said second motor in response to said second slits passing thereby due to rotation of said second encoding member.

6. A double-capstan tape driving device according to claims 1, 2, 3, 4 or 5, wherein said revolution speed control means includes a manually variable means for supplying said offset voltage to at least one of said servo loops, thereby enabling manual variation of said tension applied to said tape between said capstan.

7. A double-capstan tape driving device according to claim 3, wherein said adding means adds said offset voltage to the output of said first frequency discriminator; and wherein said difference detecting means detects the difference between said output of said adding means and the output signal from said second frequency discriminator; and wherein said difference detecting means is coupled to said second motor to change the revolution speed of said second motor as a function of said difference signal from said difference detecting means.

8. A double-capstan tape driving device according to claim 7, wherein said revolution speed control means includes a manually variable means for supplying said offset voltage to said adding means, thereby enabling manual variation of said tension applied to said tape between said capstans.

* * * * *